United States Patent [19]

Ono et al.

[11] Patent Number: 5,366,543
[45] Date of Patent: Nov. 22, 1994

[54] ALCOHOL-SOLUBLE DYE AND INK COMPOSITION CONTAINING THE SAME

[75] Inventors: Takashi Ono, Takatsuki; Tatsuya Yagyu, Neyagawa; Tetsui Akase, Moriguchi, all of Japan

[73] Assignee: Orient Chemical Industries, Ltd., Osaka, Japan

[21] Appl. No.: 73,477

[22] Filed: Jun. 9, 1993

[30] Foreign Application Priority Data

Jun. 9, 1992 [JP] Japan .................. 4-149305

[51] Int. Cl.$^5$ .......................................... C09B 69/00
[52] U.S. Cl. ..................... 106/22 K; 106/30 B; 534/728; 534/828; 534/836; 534/837; 523/161
[58] Field of Search ............... 106/22 K, 496, 30 R, 106/30 B; 534/728, 828, 836, 837; 523/161

[56] References Cited

U.S. PATENT DOCUMENTS 3,640,994 2/1972 Harnisch ..................... 534/837

FOREIGN PATENT DOCUMENTS 58-174461 10/1983 Japan ..................... C09D 11/00

*Primary Examiner*—Paul Lieberman
*Assistant Examiner*—Margaret Einsmann
*Attorney, Agent, or Firm*—Birch, Stewart, Kolasch & Birch

[57] ABSTRACT

The present invention provides a disazo salt-forming dye having excellent solubility with organic solvents, especially alcohols and glycols.

The present invention thus provides a disazo salt-forming dye represented by the Formula (I):

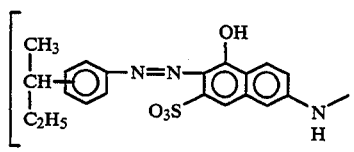

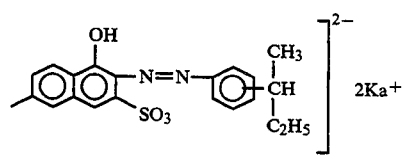

or the Formula (II):

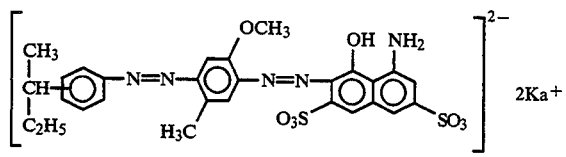

wherein Ka+ represents a cation of an amine which is substituted with at least one linear or cyclic alkyl group or aralkyl group having 6–12 carbon atoms which may be branched or interrupted by oxygen.

15 Claims, 4 Drawing Sheets

ALCOHOL-SOLUBLE DYE AND INK COMPOSITION CONTAINING THE SAME

FIELD OF THE INVENTION

The present invention relates to disazo salt-forming dyes used for ink for writing, recording, stamping etc., to be more specific, a salt-forming dye which develops bright red or purple-black color having excellent solubility in organic solvents such as alcohols, glycols etc. and the ink composition containing such dyes.

BACKGROUND OF THE INVENTION

Conventionally, as ink used for writing and recording on a material to be recorded, such as paper, or for ink-jet printing, various dyes or pigments which are dissolved or dispersed in liquid medium or binder have been used.

An ink obtained by dispersing organic pigment in a solvent has an advantage in excellent fastness such as light fastness. However, the pigment in this ink deposits or agglomerates with time and special treatment in dispersion process is therefore necessary.

Oil ink obtained by dissolving a dye in an organic solvent (e.g. hydrocarbons) is more profitable as it does not require such a troublesome dispersion process. In this ink, however it has recently been desired that the organic solvent is changed to alcohols or glycols which are low in toxicity to the human body and therefore the dye must have excellent solubility with alcohol.

As the dyes which satisfy such demand as much as possible, there are known various alcohol soluble dyes, for instance, a salt of basic dye and acid dye, a basic dye treated by fatty acid etc., a metal complex dye having a water soluble group such as a sulfonic group or an acid dye treated by an organic amine. However, the oil ink using the above listed alcohol soluble dyes (for instance, amine salt dye of acid yellow 23, 42; acid red 73, 180; direct blue 87; acid black 52 or salt-forming dye using basic dye such as auramine, rhodamine, victoria blue, methyl violet, etc.) are not satisfactory in regard to stability of ink and fastness of written image (light fastness, water resistance etc.), resulting in that the dye deposits with time or the ink increases viscosity when environmental conditions such as temperature and humidity change.

SUMMARY OF THE INVENTION

The present invention has been made in view of the above situation and the first objective of the present invention is to provide a disazo salt-forming dye having excellent solubility with organic solvents, especially alcohols and glycols.

The second objective of the present invention is to provide a dye composition and an ink composition using alcoholic solvent, which has stability with time and fastness of written trace (e.g. light fastness and water resistance).

The third objective of the present invention is to provide a red or purplish black ink which contains the above mentioned dye.

The present inventors have found that red or purplish black disazo dyes obtained by introducing a sec-butylphenyl azo group into the structure of the dyes and then salt-forming with an amine have highly preferred alcohol solubility and exhibit excellent effect as coloring agent of oil ink used for a writing pen such as a ball-point pen or a marking pen and thus accomplished the present invention.

The present invention thus provides a disazo salt-forming dye represented by the formula (I):

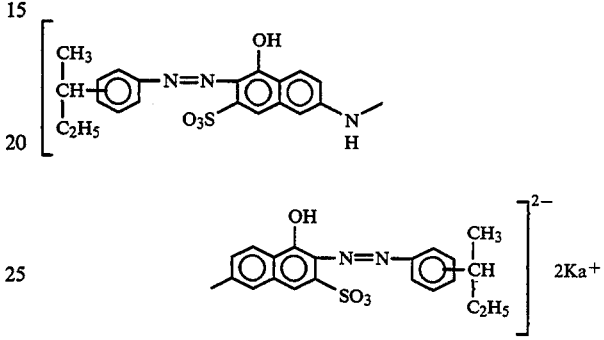

wherein Ka+ represents a cation of an amine which is substituted with at least one linear or cyclic alkyl group or aralkyl group having 6–12 carbon atoms which may be branched or interrupted by oxygen.

The present invention also provides a disazo salt-forming dye represented by formula (II):

$$\left[ \begin{array}{c} CH_3 \\ | \\ CH \\ | \\ C_2H_5 \end{array} \text{—} \bigcirc \text{—} N=N \text{—} \bigcirc\text{(OCH}_3\text{)(H}_3\text{C)} \text{—} N=N \text{—} \bigcirc\text{(OH)(NH}_2\text{)(O}_3\text{S)(SO}_3\text{)} \right]^{2-} 2Ka^+$$

wherein Ka+ is the same as mentioned above.

The present invention further provides an ink composition which contains the above mentioned disazo dye and an alcohol and/or glycol solvent.

DETAILED DESCRIPTION OF THE INVENTION

Red disazo salt-forming dye represented by said formula (I) of the present invention is obtained by salt-forming a disazo water soluble dye (III) having the structure represented by the formula:

(III)

$$\begin{array}{c} CH_3 \\ | \\ CH \\ | \\ C_2H_5 \end{array} \text{—} \bigcirc \text{—} N=N \text{—} \bigcirc\text{(OH)(MO}_3\text{S)} \text{—} \bigcirc\text{(NH)} \text{—} \bigcirc\text{(OH)(SO}_3\text{M)} \text{—} N=N \text{—} \bigcirc \text{—} \begin{array}{c} CH_3 \\ | \\ CH \\ | \\ C_2H_5 \end{array}$$

(wherein M represents a hydrogen atom or an alkali metal), with an amine. The disazo water-soluble dye may be obtained by diazotizing two mols of sec-butylaniline and coupling it with 1 mol of the following coupler:

Bis-(5,5'-dihydroxy-2,2'-naphthyl)amine-7,7'-disulfonic acid (hereinafter called di-J acid)

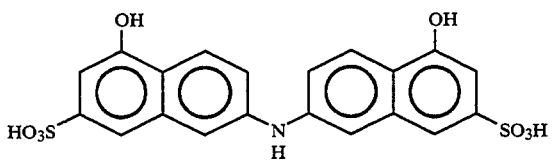

The purplish black disazo salt-forming dye of the present invention represented by the aforesaid formula (II) may be obtained by salt-forming, with an amine, a disazo dye (IV) represented by:

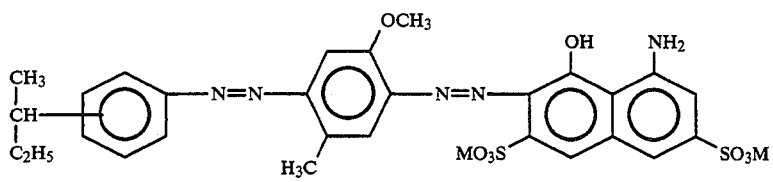

wherein M represents a hydrogen atom or an alkali metal. The disazo water soluble dye may be obtained by diazotizing an aminoazo compound represented by the formula:

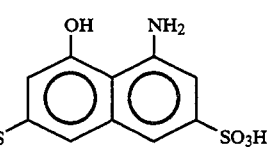

which is obtained by diazo-coupling reaction of sec-butylaniline and p-cresidine-(3-amino-4-methoxytoluene), and then coupling it with the following coupler: (8-amino-1-naphthol-3,6-disulfonic acid (hereinafter called H acid)

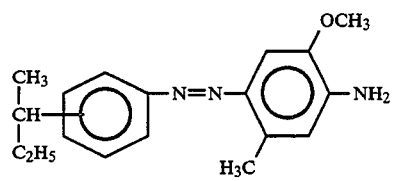

The disazo water soluble dye obtained by the aforesaid method may be salt-formed by any of the known methods. In the present invention, the method to use water system and the method to use solvent system are explained.

An example of a cation-providing agent (e.g. Ka+ Y−) used for the salt-forming reaction may be the one represented by formula:

(wherein $R^1$, $R^2$, $R^3$ and $R^4$ are respectively hydrogen, an alkyl group, an alkoxy group, a cyclohexyl group or an aralkyl group and at least one of $R^1$-$R^4$ is an alkyl, alkoxyalkyl, cycloalkyl or aralkyl group with 6–12 carbon atoms which may be branched and Y represents an inorganic or organic anion.)

Examples of the cation-providing agents are a primary, secondary, tertiary or quaternary ammonium salt of an amine represented by:

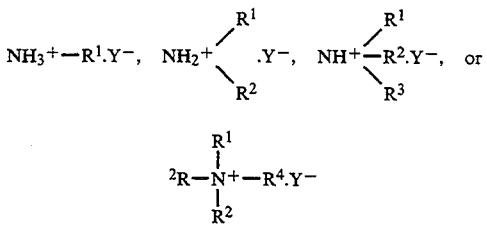

Another cation providing agent may be an amine represented by the formula:

(wherein $R^1$, $R^2$ and $R^3$ are the same as mentioned above.)

Typical examples of the amines are aliphatic amines, such as hexylamine, benzylamine, octylamine, 2-ethylhexylamine, di-(2-ethylhexyl)amine and dodecylamine; alicyclicamines, such as cyclohexylamine and dicyclohexylamine; alkoxyamines such as 3-propoxypropylamine; 3-butoxypropyl amine, di-(3-butoxypropylamine, octoxypropylamine, 3-(2-ethylhexyloxy)-propylamine; and the like. These amines may form Ka+ of the said cation providing agent Ka+ Y−.

Preferred cation providing agent is the one having more than one substitution group with 6–12 carbons and low volatility with boiling point of more than 100° C. Use of the cation providing agent of high volatility is not preferred as the salt-forming dye obtained thereby should not have sufficient oleophilic property.

The alkyl group in the aforesaid formulae (a) and (b) may be alkyl group with 1–12 carbon atoms, for instance, a methyl group, an ethyl group, a propyl group, an amyl group, a hexyl group, an octyl group, a nonyl group, a dodecyl group, a cyclohexyl group etc. The alkoxyalkyl group may be, for instance, a 3-methoxypropyl group, a 3-ethoxypropyl group, a 3-butoxypropyl group, a 3-octoxypropyl group, a 3-(2-ethylhexyl) propyl group etc. The aralkyl group may be a benzyl group, an α,α'-dimethylbenzyl group and the like.

$R^1$-$R^4$ or $R^1$-$R^3$ are selected out of these groups and they may be same or different. However, at least one of $R^1$-$R^4$ is an alkyl, alkoxyalkyl, cyclohexyl or aralkyl group with 6–12 carbon atoms which may be branched.

The reaction ratio of disazo water-soluble dye and cation providing agent of the present invention may be essentially a theoretical chemical ratio, for instance, 2-2.2 mol of cation providing agent for one mol of disazo water-soluble dye. The reaction may be conducted according to the ordinary method, for instance, disazo type water-soluble dye and aqueous solution of cation providing agent and mixed by agitation in water system for 2-5 hrs. in acid or neutral atmosphere. When the salt-formation step is conducted in an organic solvent (for instance alcohol), the process may be conducted in such way that, for instance, azo type water-soluble dye (dried product) and water insoluble or low soluble amine (for instance, cation providing agent of formula b) may be mixed under agitation in organic solvent to form a solution, followed by addition of the reaction solution into an acid aqueous solution.

The ink composition of the present invention contains the salt-forming dye represented by formula (I) or (II) and oily liquid medium.

The oily liquid medium used in the present invention is preferred to be organic solvent mainly composed of alcoholic solvent. The ink composition thus obtained is a pollution-free ink which uses the medium mainly made of the alcoholic solvent.

Typical examples of the alcoholic solvents are monovalent alcohol (for instance, simple alcohols such as ethanol, n-propanol, isopropanol, n-butanol, amyl alcohol, benzyl alcohol, cyclohexanol, diacetone alcohol; monoalkyl ethers of glycols, such as ethylene glycol monomethyl ether, ethylene glycol monoethyl ether, propylene glycol monoethyl ether, diethylene glycol monoethyl ether, dipropylene glycol monoethyl ether, etc.; monoacetates of glycols, such as ethylene glycol monoacetate, propylene glycol monoacetate etc.), divalent alcohol (for instance, glycols, such as ethylene glycol, diethylene glycol, trimethylene, glycol, triethylene glycol, tetraethylene glycol, polyethylene glycol, propylene glycol, butane diol etc.) and the like.

According to the present invention, hygienically problem-free ink may be obtained by properly mixing a low-toxic or non-toxic alcoholic solvent, such as ethanol, n-propanol, isopropanol, benzyl alcohol, ethylene glycol and phenylglycol, propylene glycol monoalkyl ether. The ink composition may also contain other hydrophilic organic solvents, such as methyl lactate, ethyl lactate, butyl lactate and the like. Further a pyrrolidone compound such as N-(2-hydroxyethyl)-2-pyrrolidone, N-methyl pyrrolidone etc. may be used in an amount of less than 15 wt % based on the total of the ink composition.

The ink composition of the present invention may be obtained by dissolving under heating 1-40 wt % of the disazo salt-forming dye in a liquid medium composed of 60-95 wt % of the organic solvent and 5-25 wt % of a binder resin (wt % being based on the total weight of the composition), followed by filtration. If necessary, a small amount of such additive as nonionic surfactant or anti-rust agent may be added. The content of the dye may vary according to the usage of ink and it is not restricted but in general, it is 20-30 wt % for ball-point pens, 5-15 wt % for marking pens and 3-10 wt % for ink jet recording.

The binder resin preferably used for the ink composition of the present invention may be alcohol-soluble resins, for instance, a low condensate of vinyl pyrrolidone popularly used for the resin of this type of ink, an alkyd resin, an acrylic resin, a phenolic resin, a styrene-maleic acid resin, a ketone resin, a rosin resin, etc.

The disazo salt-forming dye of the present invention contains two or one sec-butylphenyl azo groups in its chemical structure and has an excellent solubility in alcohols or glycols. The disazo salt-forming dye of the present invention may be formulated as an alcohol base ink composition having a high concentration if necessary and may be used for oil ink for various usages. The ink for writing pen using the disazo salt-forming dye of the present invention is free from degradation or precipitation of dye due to the changing environment such as temperature or humidity in comparison with the conventional red or purple-black ink obtained by salt-formation of amines and basic dyes and has preferred stability with time and written trace fastness (water resistance and light stability). The dye of the present invention can provide a pollution-free ink mainly using the alcoholic solvent.

EXAMPLES

The present invention is described in further detail in reference to the Examples and Comparative Examples. Unless otherwise indicated, "part" means weight part and number of "mol" in parenthesis is in terms of 100% basis.

Example 1

Synthesis of dye 1

According to the ordinary method, 30 parts (0.2 mol) of p-(sec-butyl) aniline was diazotized at 0° C. to prepare a diazo solution.

On the other hand, 51 parts (0.1 mol) of di-J acid was dissolved in the sodium hydroxide aqueous solution, to which the diazo liquid was added and mixed for 4 hours at 5°-10° C. The disazo compound obtained by salting out by acid was filtered, rinsed with water and dried to obtain 80 parts of a red dye. 40 parts of thus obtained dye was mixed for one hour at 40°-50° C. together with 18 parts of 3-(2-ethylhexyloxy)-1-propylamine, in 200 parts of alcohol to dissolve the dye. Thus obtained salt-forming liquid was added to aqueous acetic acid to precipitate dye, followed by filtration, rinsing with water and drying to obtain 50 parts of a red dye.

The resulting disazo salt-forming dye was analyzed by high speed liquid chromatography (HPLC). The results obtained are indicated in FIG. 1.

(Conditions for HPLC analysis)

Column: L-column (4.6 mm $\phi \times 150$ mm)

Carrier: $CH_3CN: H_2O = 45:55$ (volume ratio)

($0.0125N\ KH_2PO_4$, $0.015N\ K_2HPO_4$)

Column temp.: 45C.

Flow rate: 1.5 ml/min.

Detecting wavelength: 313 nm

Preparation of sample: 0.05 g of dye was dissolved in 15 ml of a carrier to prepare the solution of analytical sample. Analysis was made with 5 $\mu l$ of the sample.

The chemical structure of the red dye shows the formula (I) wherein $Ka^+$ is $H_3N^+C_3H_6OCH_2CH(C_2H_5)C_4H_9$ which has red color and 530 nm maximum absorption wavelength ($\lambda$ max). Visible absorption sepctrum (solvent: methanol) is indicated in FIG. 2.

Example 2

Synthesis of Dye 2

Other than that 18 parts of 3-(2-ethylhexyloxy)-1-propylamine was replaced for 24 parts of di-(2-ethylhexyl)amine, the process was carried out in the same manner as in Example 1 to obtain disazo dye.

Dye 2: Red, 530 nm ($\lambda$ max)

Chemical structure: The formula (I) wherein Ka+ shows

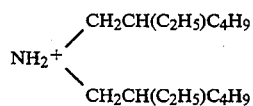

Example 3

Synthesis of Dye 3

Using 17 parts (0.1 mol) of N,N-diethylbenzylamine, the process was carried out in the same manner as in Example 1 to obtain the disazo dye indicated below.

Dye 3: Red, 530 nm

Chemical structure: Formula (I) wherein Ka+ shows

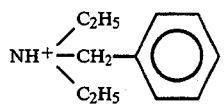

Example 4

Synthesis of Dye 4

According to the ordinary method, 30 parts (0.2 mol) of p-(sec-butyl)aniline was diazotized at 0° C. and it was coupled with 28 parts (0.2 mol) of p-cresidine by acid coupling to make it into an amino azo compound which was then diazotized to prepare a monoazodiazotized liquid.

On the other hand, 68 parts (0.2 mol) of H acid was dissolved in a sodium hydroxide aqueous solution, followed by addition of monoazodiazotized liquid and the mixture was stirred at 5°–10° C. for 4 hrs.

Thus obtained diazotized coupling reaction solution was filtered and the pH of the filtrate was adjusted to 7–8, followed by addition of an aqueous acetic acid solution of 52 parts of 3-(2-ethylhexyloxy)-1-propylamine and the mixture was mixed for 4 hrs. at room temperature. Subsequently, pH was adjusted to 5.0, the precipitated dye was heated, filtered, rinsed with water and dried to obtain 100 parts of a purple black dye.

In the same manner as in Example 1, the obtained salt-forming dye was analyzed by HPLC analysis (detecting wavelength: 313 nm). The results are shown in FIG. 3. FIG. 4 indicates a visible absorption spectrum (solvent: methanol).

Dye 4: Bluish purple, 594 nm

Chemical structure: Formula (II) wherein Ka+ is $H_3N+C_3H_6OCH_2CH(C_2H_5)C_4H_9$.

Example 5

Synthesis of Dye 5

Other than that 52 parts (0.4 mol) of 3-(2-ethylhexyloxy)-1-propylamine was replaced for 53 parts (0.4 mol) of 3-butoxy-1-propylamine (0.4 mol), the process was carried out in the same manner as in Example 3, to obtain a disazo salt-forming dye shown below.

Dye 5: Bluish purple, 594 nm

Chemical structure: Formula (II) wherein Ka+ is $H_3N+C_3H_6OC_4H_9$.

Comparative Examples 1–3

According to the ordinary method, the following dyes a–c were synthesized and to determine the effect of sec-butylphenylazo group, solubility and ink compatibility were compared.

Dye a: Red

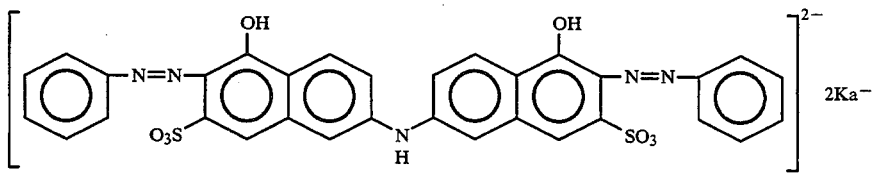

Ka+: $H_3NC_3H_6OCH_2CH(C_2H_5)C_4H_9$

Dye b: Red

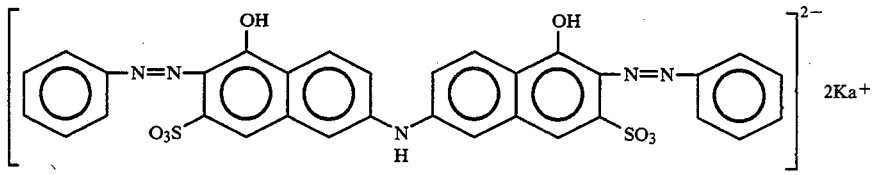

Ka+: $H_3N+CH(C_2H_5)CH_3$

Dye C: Bluish purple

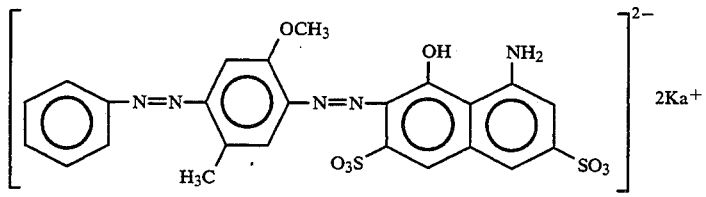

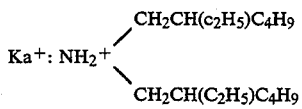

Solubility Comparing Test

Solubility of disazo salt-forming dyes (dye 1-5) obtained in Examples 1-5 and dyes a-c into alcohol type organic dye was tested. While stirring each dye with a magnet stirrer, the dye was first added to 100 parts of solvent and it was spotted on the filter paper (Toyo filter paper No. 2) to investigate the saturation concentration. When ethylene glycol or mixed solvent was used for the solvent, dye was added after heating the solvent to 70-80 C. The results are shown in Table 1.

TABLE 1

| Dye No. | Ethanol | n-Propanol | Ethylene glycol | Mixed solvent |
|---|---|---|---|---|
| 1 | 20 | 15 | 30 | 30 |
| 2 | 25 | 20 | 30 | 40 |
| 3 | 20 | 10 | 30 | 30 |
| 4 | 25 | 20 | 30 | 40 |
| 5 | 25 | 20 | 30 | 40 |
| a | 10 | 5 | 30 | 30 |
| b | 5 | 5 | 30 | 30 |
| c | 10 | 10 | 30 | 40 |

1) Mixing ratio
Phenylene glycol:Benzyl alcohol:oleic acid = 4:1:1
2) Numbers in the Table indicate the solubility (wt %) into the respective solvent.

Example 1

| Preparation of the ink for alcohol marker pen | |
|---|---|
| Components | Amount (Parts) |
| Dye 1 | 7 |
| Ethanol | 58 |
| n-Propanol | 10 |
| Benzyl alcohol | 5 |
| Ethyl lactate | 10 |
| Phenolic resin | 10 |

The above components were uniformly mixed at 40° C. to prepare a red ink. Evaluation test of this ink was conducted in regard to the following items.

Evaluation Method

Evaluation of the test sample was conducted by the following method.

Stability with time:

30 ml of ink was taken into a glass bottle and it was put to 3 month test in the low/high temp. incubator (Tradename: Incubator, manufactured by Sanyo Electric), (temp. range −10°-50° C., repetition at 60 minutes interval) and subsequently precipitation of dye and increase of viscosity of ink were investigated and the results were evaluated.

Water resistance

Ink was set on the pen and after writing on JIS P3201 paper (writing paper), it was immersed in distilled water for 24 hrs., followed by drawing up, air-drying, observation of holograph and evaluation.

Light stability

Ink was set on a pen and after writing on JIS P3201 paper (writing paper), it was irradiated by light for 5 hrs. in long life fade-meter (carbon arc type) and written trace was observed and evaluated.

Results are shown in Table 2

TABLE 2

| Example No. | Stability with time | Water resistance | Light resistance |
|---|---|---|---|
| 6 | Excellent | Excellent | Good |
| 7 | Excellent | Excellent | Good |
| 8 | Excellent | Excellent | Good |
| 9 | Excellent | Excellent | Good |

After the stability with time test, no precipitation of dye nor increase of viscosity of ink were observed. Water resistance and light stability of written trace were good as shown in Table 2.

Example 7

| Component | Amount (parts) |
|---|---|
| Dye 4 | 10 |
| Ethanol | 65 |
| Ethyl lactate | 10 |
| Benzyl alcohol | 5 |
| Ketone resin | 10 |

The above components were uniformly mixed and dissolved at 60° C. and filtered to prepare a black ink. In the same manner as in Example 6, its stability with time was investigated but no precipitation of dye nor increase of viscosity of ink were observed. Water resistance and light stability of written trace were good as shown in Table 2.

Preparation of Oil Ink for Ball-Point Pen

Example 8

| Components | Amount (weight parts) |
|---|---|
| Dye 2 | 20 |
| Phenyl glycol | 45 |
| Benzyl alcohol | 9 |
| Surfactant*[1] | 5 |
| Polyvinyl pyrolidone | 2 |
| Ketone resin*[2] | 20 |

*[1]Tradename: Prisurf P-208, manufactured by Daiichi Kogyo Seiyaku Co.
*[2]Tradename: Hilac, manufactured by Hitachi Chemical Co.

The above components were uniformly mixed and dissolved at 60° C., filtered to prepared a red ink.

Stability with time was investigated in the same manner as in Example 6, but no precipitation of dye nor increase of viscosity of ink were observed. Water resistance and light stability of holograph were good as shown in Table 2.

Example 9

| Components | Amount (parts) |
|---|---|
| Dye 4 | 30 |
| Phenyl glycol | 35 |
| Benzyl alcohol | 8 |
| Surfactant*[1] | 5 |
| Polyvinyl pyrolidone | 2 |
| Ketone resin*[2] | 20 |

The above components were uniformly dissolved at 60 C., filtered to prepare a black ink. Stability with time was investigated in the same manner as in Example 6 but no precipitation of dye nor increase of viscosity of ink were observed. Water resistance and light stability of written trace were good as shown in Table 2.

Comparative Example 4

Other than that dye 1 of the present invention used in Example 6 was replaced by dye a of comparative example 1, the process was carried out in the same manner as in Example 6 to prepare a red ink. Stability with time of the resulting ink was inferior and writing test conducted 3 months after preparation indicated scratchy holograph and it was unsuitable for the ink of alcohol marker pen.

Comparative Example 5

Other than that the dye 1 of the present invention used in Example 6 was replaced by dye b of Comparative Example 2, the process was carried out in the same manner as in Example 6 to prepare a red ink. The resulting ink was unstable in the changing environment much as temperature and humidity and water resistant of written trace was not obtained.

Comparative Example 6

Other than that the dye 4 of the present invention used in Example 7 was replaced for dye c of Comparative Example 3, the process was carried out in the same manner as in Example 9 to prepare a black ink. The resulting ink indicated inferior stability with time and in the writing test conducted 3 months after preparation, it was unsuitable for writing.

Figure 1:
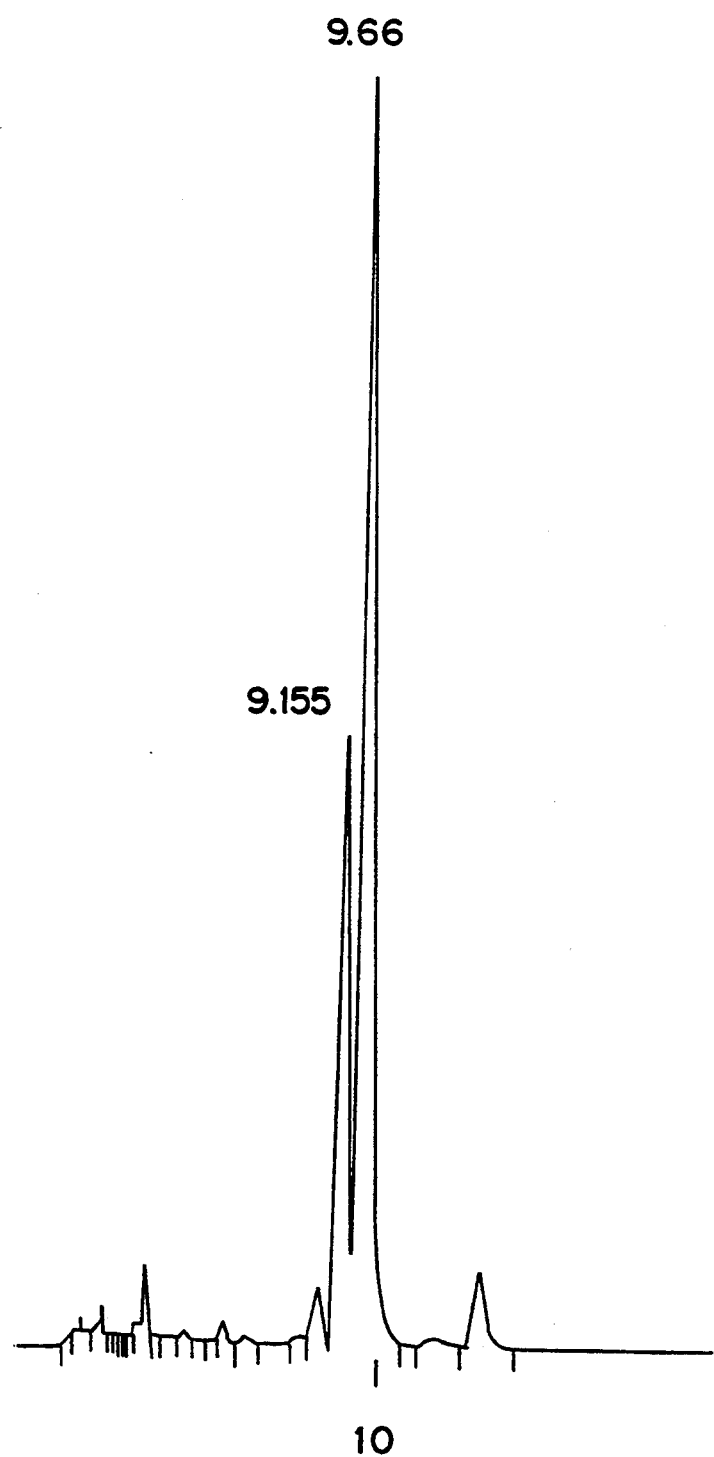
FIG. 1 shows a graph to indicate high speed liquid chromatogram of dye 1
Figure 2:
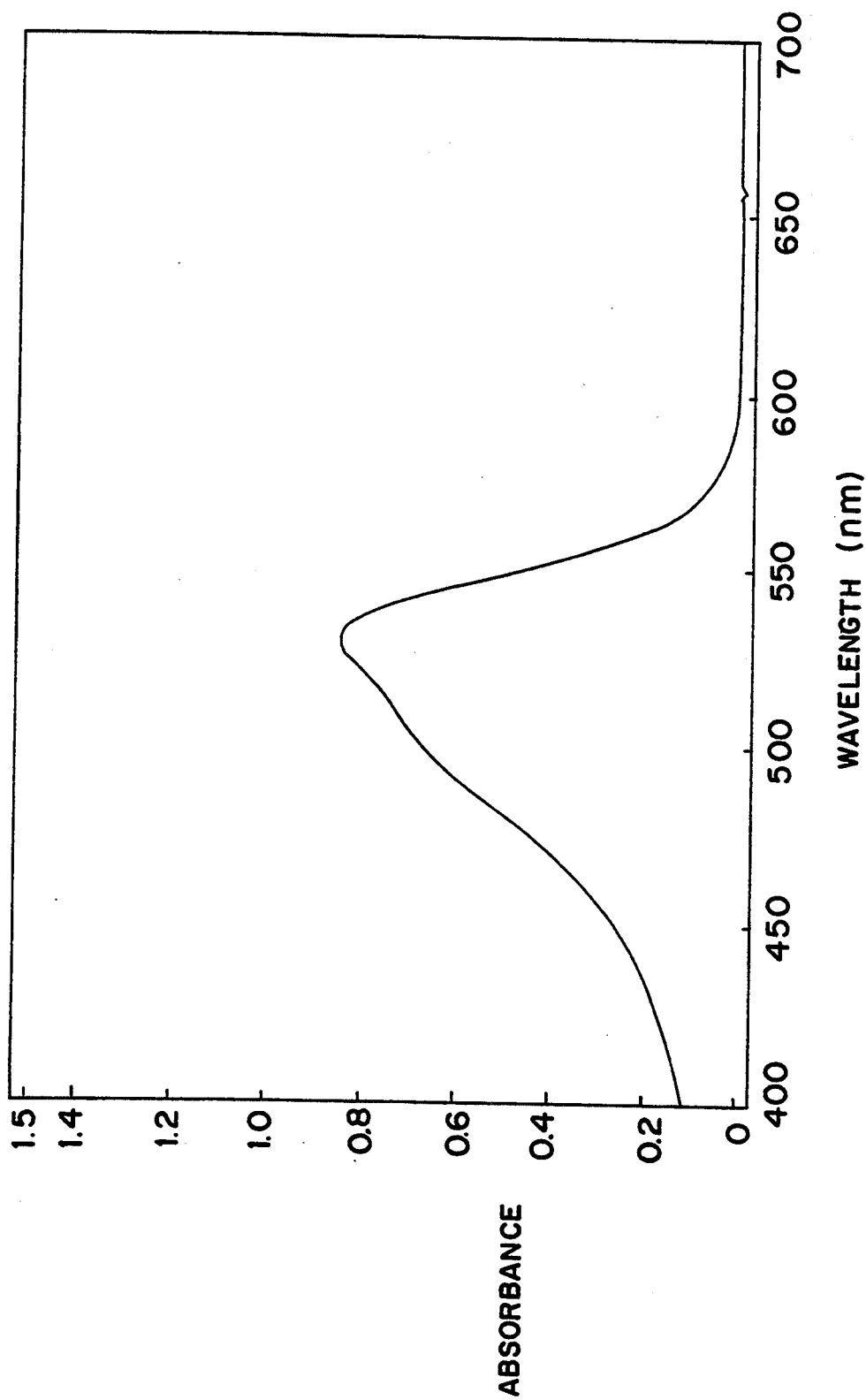
FIG. 2 shows a graph to indicate visible absorption spectrum of dye 1.
Figure 3:
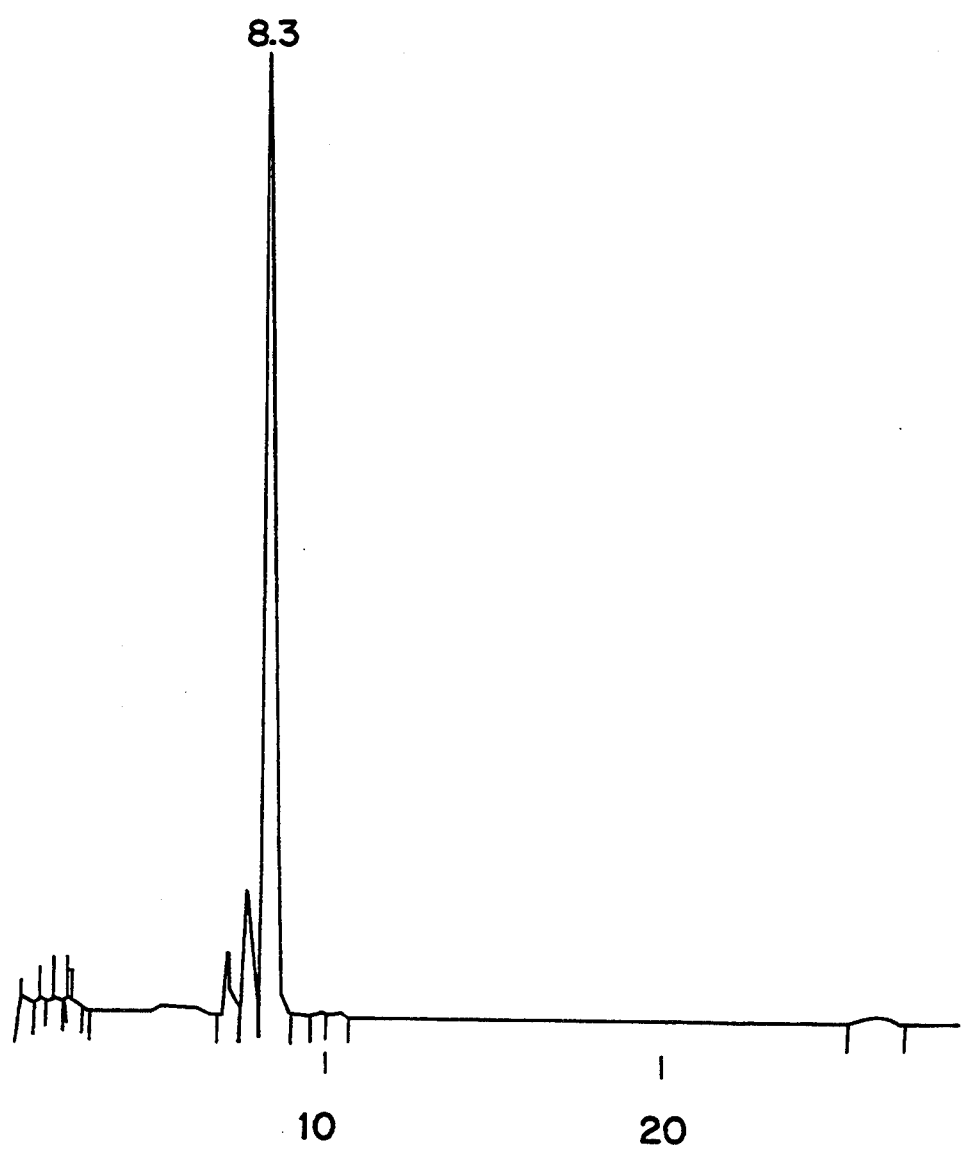
FIG. 3 shows a graph to indicate high speed liquid chromatogram of dye 4.
Figure 4:
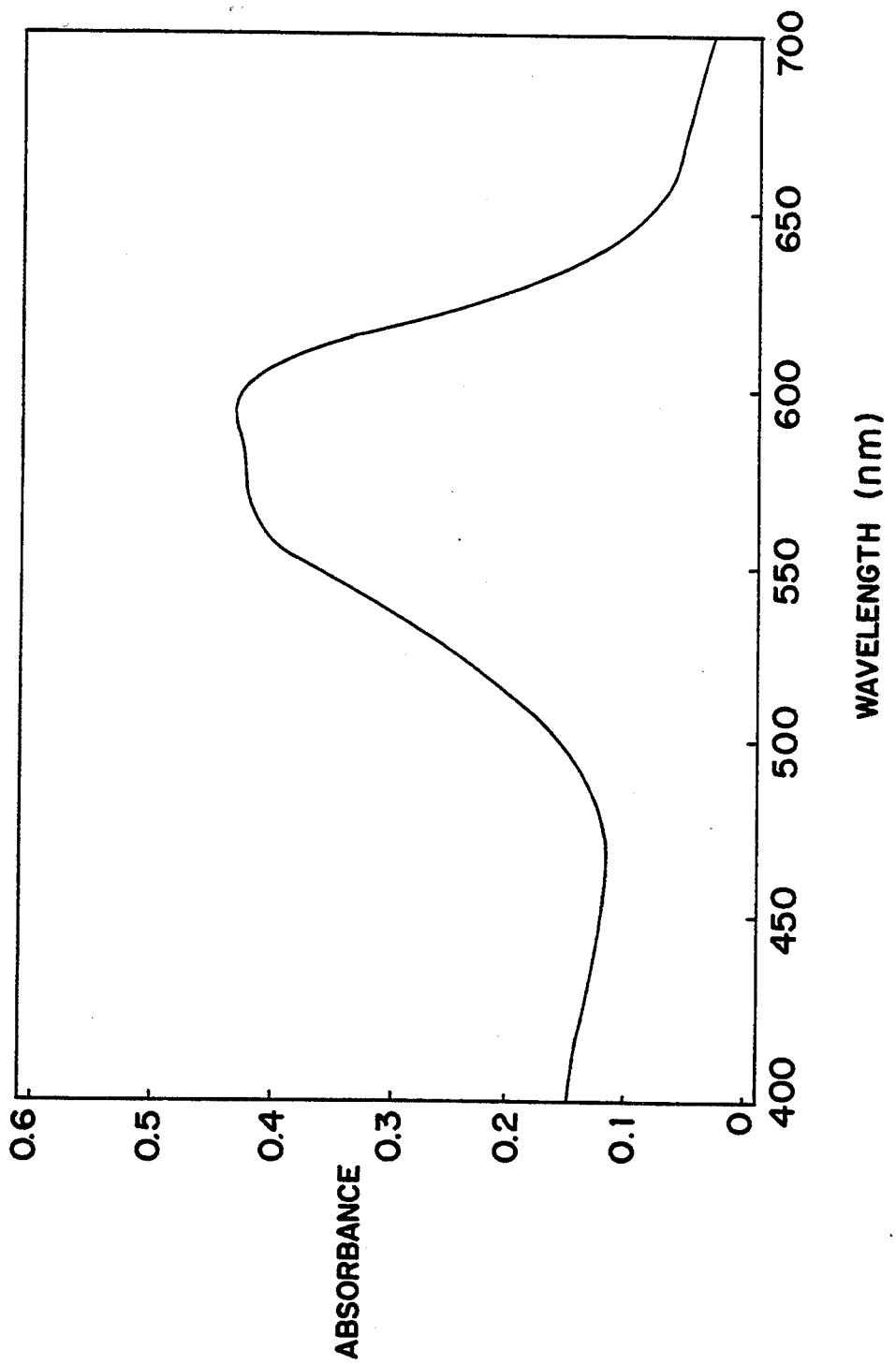
FIG. 4 shows a graph to indicate visible absorption spectrum of dye 4.

What is claimed is:

1. A disazo salt-forming dye represented by the formula (I):

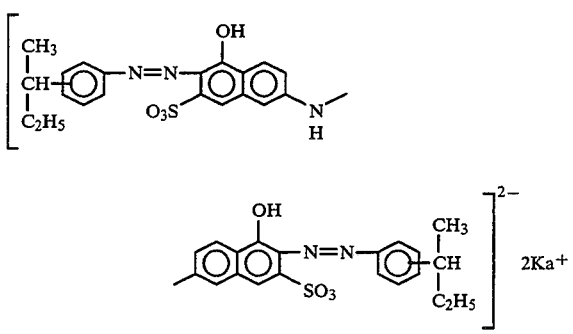

wherein Ka+ represents a cation of an amine which is substituted with at least one linear or cyclic alkyl group or aralkyl group having 6–12 carbon atoms which may be branched or interrupted by oxygen.

2. The disazo salt-forming dye of claim 1, wherein said cation of an amine is a primary, secondary, tertiary or quaternary ammonium cation.

3. The disazo salt-forming dye of claim 1, wherein Ka+ is $H_3N^+C_3H_6OCH_2CH(C_2H_5)C_4H_9$.

4. The disazo salt-forming dye of claim 1, wherein Ka+ is

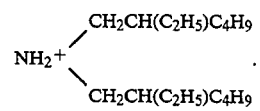

5. The disazo salt-forming dye of claim 1, wherein Ka+

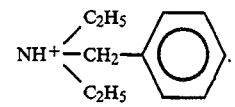

6. A disazo salt-forming dye represented by formula (II):

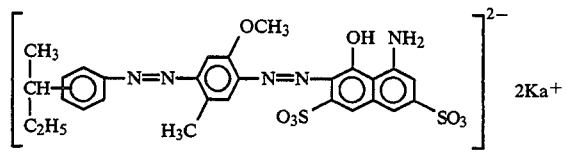

where Ka+ represents a cation of an amine which is substituted with at least one linear or cyclic alkyl group or aralkyl group having 6–12 carbon atoms which may be branched or interrupted by oxygen.

7. The disazo salt-forming dye of claim 6, wherein said cation of an amine is a primary, secondary, tertiary or quaternary ammonium cation.

8. The disazo salt-forming dye of claim 6, wherein Ka+ is $H_3N^+C_3H_6OCH_2CH(C_2H_5)C_4H_9$.

9. The disazo salt-forming dye of claim 6, wherein Ka+ is $H_3N^+C_3H_6OC_4H_9$.

10. An ink composition comprising the disazo salt-forming dye described in claim 1 or 2 and an alcohol or glycol medium, or a mixture thereof.

11. The ink composition of claim 10, wherein said alcoholic medium is selected from the group consisting of monovalent alcohols, divalent alcohols, monoalkyl ethers of glycols, monoacetates of glycols and mixtures thereof.

12. The ink composition of claim 10 further comprising an alcohol-soluble binder resin selected from the group consisting of a low condensate of vinyl pyrrolidone, an alkyd resin, an acrylic resin, a phenolic resin, a styrene-maleic acid resin, a ketone resin and a rosin resin.

13. The ink composition of claim 12, comprising 1–40 weight % of said disazo salt-forming dye, 60–95 weight % of said alcoholic medium and 5–25 weight % of said binder.

14. An ink composition comprising a disazo salt-forming dye represented by one of the following formulae:

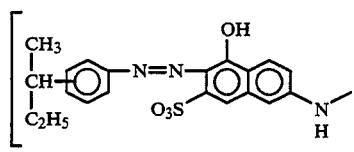 (I)
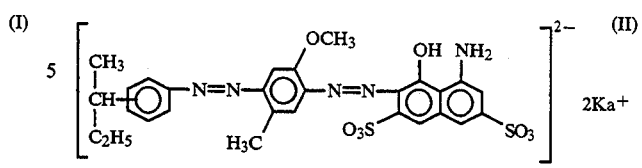 (II)
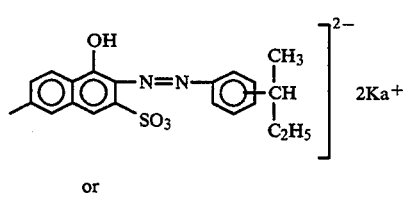
or
wherein Ka+ represents a cation of an amine which is substituted with at least one linear or cyclic alkyl group or aralkyl group having 6–12 carbon atoms which may be branched or interrupted by oxygen.
15. The ink composition of claim 14, wherein said cation of an amine is a primary, secondary, tertiary or quaternary ammonium cation.